(12) United States Patent  (10) Patent No.: US 7,588,273 B2
Tittemore  (45) Date of Patent: Sep. 15, 2009

(54) DOGGY WALK SCOOPER

(76) Inventor: James Allan Tittemore, 152 Arbour Lake Way NW, Calgary, Alberta (CA) T3G 3W9

( * ) Notice: Subject to any disclaimer, the term of this patent is extended or adjusted under 35 U.S.C. 154(b) by 187 days.

(21) Appl. No.: 11/545,008

(22) Filed: Oct. 10, 2006

(65) Prior Publication Data

US 2008/0211244 A1 Sep. 4, 2008

(51) Int. Cl.
*A01K 29/00* (2006.01)
*E01H 1/12* (2006.01)
(52) U.S. Cl. ........................................ 294/1.4
(58) Field of Classification Search ............ 294/1.3, 294/1.4, 1.5; 248/101; 15/257.1
See application file for complete search history.

(56) References Cited

U.S. PATENT DOCUMENTS 3,659,891 A * 5/1972 Pettenon et al. ............. 294/1.4
4,056,278 A * 11/1977 Bau et al. ..................... 294/1.4
4,447,082 A * 5/1984 Lindholm .................... 294/1.4
D461,027 S * 7/2002 Gardner ...................... D30/162
7,188,878 B1 * 3/2007 Kraus ......................... 294/1.4
7,374,215 B2 * 5/2008 Anderson .................... 294/1.3

* cited by examiner

*Primary Examiner*—Paul T Chin
(74) *Attorney, Agent, or Firm*—David A. Guerra

(57) ABSTRACT

An animal waste collection device allows collection of waste without soiling the device or user. The Doggy Walk Scooper comprises an elongated handle; a hooked grip disposed at one end and a pick-up and collection device at the other end comprising a modified elongated cylindrical member within which, and around which, a bag is mounted for receiving and storing animal waste. The posterior underside of the cylinder is notched out to permit the closed end of the receptacle bag to hang down and the open end of the receptacle bag to be rolled back inside-out such that it completely covers the remaining underside of the cylinder. The bag is secured around the cylinder by an elastic band fitted in the notch such that it cannot be dislodged when in use. When detached, the soiled part of the bag collapses inward for sanitary disposal.

10 Claims, 2 Drawing Sheets

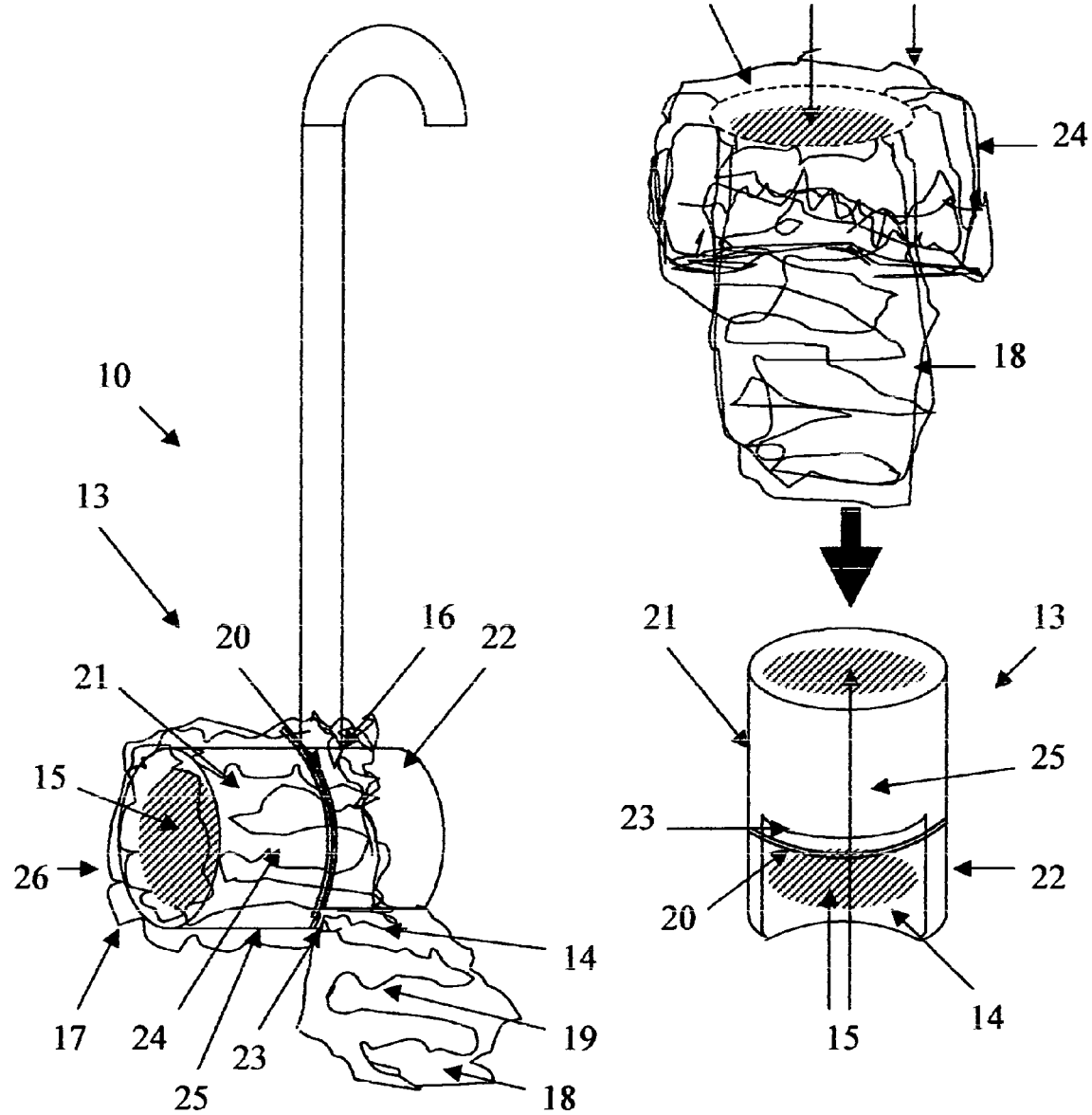

DOGGY WALK SCOOPER

The invention relates to animal waste collection devices and methods. In particular, the invention relates to an animal waste collection device and method that is used in combination with a bag for collecting, storing, and disposing of the animal waste.

BACKGROUND OF THE INVENTION

It is estimated that North America has more pets than people. This equates to in excess of 250 million pets, a significant portion of which are dogs. As many of these animals are in urban areas, the public is demanding increasing animal regulations related to health and safety.

While pet owners residing in municipal regions are often subject to ordinances requiring that their animals be leashed at all times in public, many regions and municipalities have also adopted so-called "pooper-scooper" ordinances, which require pet owners to accept personal responsibility for collection and disposition of the waste material produced by their pet animals. This trend that started years ago in urban centers is now spreading to encompass the entire country.

When pet owners are subject to both leash-laws and pooper-scooper ordinances, the owner is obliged to retrieve and dispose of pet wastes when and where the animal decides to relieve itself This distasteful routine is familiar to all responsible dog owners and many bystanders.

Unfortunately, previous attempts at devising pooper-scoopers often resulted in large and awkwardly-configured devices that are inconvenient to carry and often soiled in use. In addition, some designs require the use of both hands, which is extremely difficult when holding a pet's leash. Other devices comprise a simple cup-shaped receptacle that is held in the hand during and after waste pick-up, often resulting in soiling of the user and exposing the user to the odor of the animal waste. Still other devices comprise a flexible and relatively unstable wire receptacle unit around which a bag is placed and fastened to a handle unit and within which waste is collected; disconnection of the waste bag from the handle and wire receptacle unit is often messy, resulting in soiling of the user by animal waste material on the bag.

Typical prior art in pooper-scoopers is shown, for example, in the following patents:

| | | |
|---|---|---|
| 6,237,972 | May 2001 | Jung |
| 6,164,710 | December 2000 | Shibuya |
| 6,135,520 | October 2000 | Miller |
| 6,102,457 | August 2000 | Smith |
| 6,086,123 | July 2000 | Sowinski |
| 6,062,618 | May 2000 | Figueroa |
| 6,068,311 | May 2000 | Jones |
| 5,403,050 | April 1995 | Searing |
| 5,400,572 | March 1995 | Peck |
| 5,290,080 | March 1994 | Yoshioka |
| 5,370,431 | December 1994 | Henninger |
| 4,875,729 | October 1989 | Peck |

As there do not appear to exist any totally sanitary, effective, lightweight, manageable and convenient animal waste collection devices at present, the simple animal waste collection device of choice by many animal owners comprises a paper or plastic bag within which a human hand is inserted to grasp and pick up the animal waste. Soiling of the user of this simple hand-in-bag device by the animal waste is not uncommon and the distasteful texture and odor of the animal waste results in an uncomfortable remainder of the outing with the animal.

The present invention is a sanitary, easily manageable, lightweight, simple and stable device that employs an elongated handle disposed at one end with a hooked grip and at the other end with a collection cylindrical member. The cylindrical member may be manufactured in various sizes to accommodate various sizes and amounts of animal waste. The cylinder may also be modified to employ a flat underside to facilitate collection of animal waste from flat surfaces. A quick forward movement of the cylindrical member ensures clean and complete pick up of animal waste material from all surfaces. The posterior underside of cylindrical member is cut out to permit the closed end of the inserted bag to hang down and to permit the open end of the receptacle bag, when rolled back inside-out around the exterior of the cylinder, to completely cover the remaining underside of the device to ensure no contact of animal waste material with the device itself or with the user. In addition, the receptacle bag is partially shielded from the user resulting in a more sanitary and pleasant waste storing operation when transporting the waste during a walk with the animal. The hooked grip on the opposing end of the handle further enhances the waste carrying task by permitting the device to be carried in a position that is naturally perpendicular to the ground, ensuring an ergonomically sound carrying procedure and, if necessary, allowing the device to be hooked on the forearm to free up both hands. The handle may be manufactured in various lengths to accommodate individual differences in height and arm length.

As described in the preceding paragraphs, a need still exists in the art for a waste pick-up device that is completely sanitary, simple, lightweight, manageable and cost-effective. Further, a need exists for an animal waste collection device that is not awkward to use, usually requires only one hand to operate, is environmentally friendly, and avoids the general distastefulness associated with gathering and disposing of pet waste or cleaning the device after use. Further, a need exists for an animal waste collection device that allows for re-cycling of a variety of receptacle bags that can be attached conveniently to the device. Further, a need exists for an animal collection device that employs a comfortable grip that permits firm grasping of the device when picking up animal waste and allows the receptacle end of the device to naturally hang down to keep from the user's view that distasteful animal waste material. Further, the hooked grip can be mounted on the forearm when the device is not in use to free up both hands.

SUMMARY OF THE INVENTION

An aspect of the invention provides an animal waste collection device. The animal waste collection device allows collection of waste into a bag without soiling the device itself or the user. The animal waste collection device comprises an elongated handle, a hooked grip disposed at one end of the elongated handle that permits firm and comfortable grasping of the device when picking up animal waste and the handle having a shape such that it can be hooked over the forearm when not in use to free up both hands; a pick-up and collection device disposed at the other end of the elongated handle and comprising a modified elongated cylindrical member around which, and within which, a bag is mounted for receiving and storing animal waste. The cylindrical member is notched out on the posterior underside, allowing the closed end of the receptacle bag to hang down and permitting the open end of the bag to be rolled back inside-out over the exterior of the cylinder such that it fully covers the remaining underside of the device thus ensuring that no part of the actual cylinder comes into contact with the animal waste. The notched underside also ensures that the animal waste is visually shielded from the individual holding the device, thus resulting in a relatively pleasant experience when carrying the device with animal waste in the receptacle. The cylinder is round but may be flattened on the underside to facilitate the pick up of animal waste from flat surfaces. A quick forward movement of the cylindrical member ensures clean and complete pick up of animal waste material from all surfaces. A bag is utilized for receiving and storing animal waste and comprises a closed and open end where the open end of the bag is complementary to the elongated cylindrical member. The closed end of the bag is inserted through the receiving end of the cylinder and the open end of the bag is rolled back over the exterior of the receiving end past the anterior area of the notch and secured by means of an elastic band, or other similar fastening device, fitted at the front of the notch and over the bag and around the outer circumference of the cylindrical member. The placement of the elastic band at the front of the underside notch ensures that it is shielded by the front part of the cylinder and will not become dislodged when in use. The utilization of a receptacle bag permits multiple pick-up operations.

These and other aspects, advantages and salient features of the invention will become apparent from the detailed description, which, when taken in conjunction with the annexed drawings, where like parts are designated by like reference characters throughout the drawings, disclose embodiments of the invention.

FIG. 3 is a schematic illustration of the pick-up and collection device, the modified elongated cylindrical member, the bag used for the animal waste collection device, and the elastic band or similar fastening device with which to fasten around the rolled-back open end of the bag, as embodied by the invention.

FIG. 4 is a schematic illustration of the cylindrical member standing on its posterior end and the receptacle bag about to be inserted into the device, the open end of the bag to be rolled back over the cylinder inside-out as to completely cover the underside of the cylinder. The bag is fastened at the anterior part of the notch with an elastic band that secures the bag around the circumference of the cylinder.

DETAILED DESCRIPTION OF THE INVENTION

Figure 1:
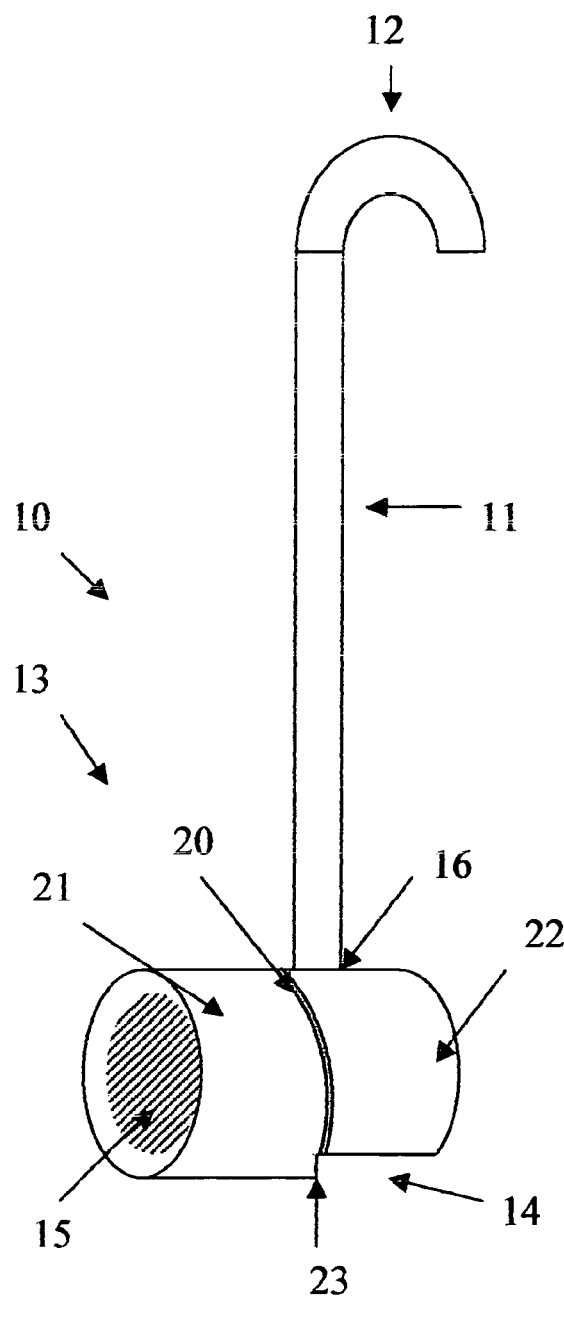
FIG. 1 is a schematic illustration of an animal waste collection device, as embodied by the invention.

An animal waste collection device, as set forth herein, provides a clean, convenient device for collecting animal waste for one-handed animal waste collection. The animal waste collection device 10 is illustrated in FIG. 1, with further details of the animal waste collection device illustrated in FIG. 2, FIG. 3 and FIG. 4. The figures set forth are exemplary configurations of the animal waste collection device, as embodied by the invention, which are intended for illustrative purposes.

In FIG. 1, the animal waste collection device 10 comprises an elongated handle 11; a hooked grip 12 disposed at one end of the elongated handle that permits firm and comfortable grasping of the device when picking up animal waste, the handle shape being ergonomically sound as to permit the device to be grasped in such a manner as to hang straight downward when carrying it and positioned as to shield the user from the distasteful view and smell of animal waste in the receptacle bag and the handle having a shape such that it can be hooked over the forearm when not in use to free up both hands; a pick-up and collection device 13 disposed at the other end of the elongated handle. The handle 11 is attached to the pick-up and collection device 13 at 16 and may be modified to vary in length to accommodate the height and arm length of the user. The pick-up and collection device has an anterior portion 21, a posterior portion 22 and a notched-out underside 14. The elastic band 20 fits into the anterior part of the notch 23 and around the remaining outer circumference of the cylinder. The recessed notch protects the elastic band or other fastening device from becoming dislodged when the device is in use. The shaded area 15 indicates the interior area of the pickup device.

Figure 2:
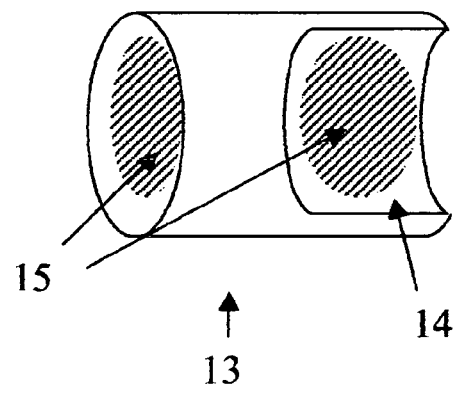
FIG. 2 is a schematic illustration of the cylindrical member positioned on its side, and the notched portion of the underside of the cylindrical member, as embodied by the invention.

The pick-up and collection device 13 is illustrated in FIG. 1 and in further detail in an underside view in FIG. 2. The pick-up and collection device 13 comprises an elongated cylindrical member that is notched on the underside 14. The shaded areas 15 indicate the interior areas of the cylinder.

FIG. 3 further illustrates the animal waste collection device 10, the collection cylindrical member 13 and bag device 17. When the closed end of the collection bag 18 is inserted into the receiving end 21 and through the cylinder 13, the notched underside 14 of the cylinder 13 permits the collection bag 17 to form a pouch-like area 19 underneath the elongated cylinder ensuring that waste will not be able to drop out of the device if tipped forward. The extended upper portion of the cylinder 22 shields from view the animal waste in the bag. The open end of the receptacle bag 26 is rolled back inside-out over the circumference of the anterior of the cylinder 21 such that the rolled back portion 24 extends beyond the front of the notch 23 to completely cover the remaining underside of the cylinder 25. The elastic band 20 that secures the bag to the cylinder fits into the anterior part of the notched underside 23 and wraps around the bag and the entire circumference of the cylinder resting to the anterior of the handle connection 16. The recessed notch 23 permits the anterior portion of the cylinder 21 to protect the fastening device 20 from the ground surface when the device is in use, ensuring that it does not scrape on the ground and become dislodged during pick-up of waste. The shaded area 15 indicates the interior area of the cylinder and collection bag. The bag 17 can be easily disposed of by disengaging the elastic band 20, or similar securing device, so that the bag collapses inward and downward and the waste itself does not come into contact with the device or the user.

The bag 17 can comprise any generally material that is non-permeable to animal waste. For example, the bag 17 can comprise materials, such as, but not limited to, plastics, rubber, synthetic materials, fabric, coated paper, paper, and combinations thereof The bag 17 may comprise biodegradable material to present an environmentally friendly construction.

The bag 17 can be pliable and stretchable to permit secure fastening to the elongated cylindrical member 13 or it can be a recycled bag that is attached by an elastic band 20

FIG. 4 further illustrates the collection cylindrical member 13 and bag device 17. The posterior closed portion of the collection bag 18 is inserted into the open anterior part of the cylinder 21. Once inserted, the posterior closed part of the receptacle bag 18 protrudes from the posterior of the cylindrical member 22 and will hang down through the notched underside 14 of the cylinder. The bag is rolled back inside-out 24 over the anterior external circumference of the cylinder 21 until the entire underside of the cylinder 25 is covered by the collection bag and beyond the beginning of the notched-out area 23. An elastic band 20 fits over the bag that completely covers the anterior 21 of the collection cylinder 13. The band is fitted into the recessed front of the notch 23 and around the circumference of the cylinder to hold the bag secure. The shaded areas 15 indicate the interior areas of the cylinder and collection bag.

Therefore, the animal waste collection device, as embodied by the invention, can provide a completely sanitary, manageable, lightweight, convenient, one-handed device for the neat and easy collection of animal waste. The design of this animal waste collection device, as embodied by the invention, overcomes the previously noted complexities and deficiencies of existing pooper-scoopers, and, most importantly, precludes soiling of any part of the animal waste collection device. Thus, a user of the animal waste collection device need not clean the animal waste collection device after each use. Of course, the animal waste collection device, as embodied by the invention, comprises materials that are readily cleaned, such as, but not limited to, plastic, metals, and combinations thereof Further, given the configuration of the bag to include a pouch-like area, the animal waste collection device can be used for multiple animal waste pick-up operations with one bag.

While embodiments of the invention have been described, the present invention is capable of variation and modification, and therefore should not be limited to the description herein. The invention includes changes and alterations that fall within the purview of the claims. Individual components of the described and illustrated embodiments may be used interchangeably with each other component of the described and illustrated embodiments.

The invention claimed is:

1. An animal waste collection device for collecting waste into a bag without soiling the animal waste collection device itself or the user, the animal waste collection device comprising:
    an elongated handle;
    a grip disposed at one end of the elongated handle; and
    a pick-up and collection device disposed at the other end of the elongated handle, said pick-up and collection device comprising:
        a substantially cylindrical member having a receiving end, an anterior portion, a defined notched-out section on a posterior underside, and an interior area; and
        a receptacle bag that is inserted closed-end through the receiving end of the cylindrical member and an open end rolled back inside-out over an exterior of the receiving end of the cylindrical member up to and beyond the notched underside, the receptacle bag being secured by an elastic band removably fitted into an anterior portion of the notched underside and around a portion of the bag that completely covers the anterior portion of the cylindrical member;
    wherein the notched-out section is in communication with the interior area of the cylindrical member and configured to receive the closed end of the bag therethrough.

2. The animal waste collection device as described in claim 1 wherein the notched-out posterior underside of the cylindrical member is configured so that the entire remaining anterior portion of the underside of the cylinder can be completely covered by the receptacle bag when the closed end of the bag is inserted through the receiving end of the cylinder and the open end of the bag is rolled back inside-out beyond the anterior area of the notch in such a manner as to ensure that only the receptacle bag, and no part of the cylindrical member itself, comes into contact with the animal waste.

3. The animal waste collection device as described in claim 2 wherein the anterior portion of the notched-out underside is configured to removable retain the elastic band in position around the remaining circumference of the cylinder member and to prevent the elastic band from contacting the ground and becoming dislodged from the cylindrical member during use.

4. The animal waste collection device as described in claim 3 wherein the cylindrical member and the notched-out underside being configured so that the rolled-back portion of the receptacle bag collapsing inward and downward with the weight of gravity through the receiving end of the cylindrical member and out the bottom end into a disposal bin, ensuring the sanitary disposal of the bag and the waste such that no animal waste comes into contact with the collection device itself or with the user.

5. The animal waste collection device as described in claim 2 wherein the open end of the bag being complementary to the elongated cylindrical member of the pick-up and collection device and the closed end allowed to extend through, and wherein the notched-out underside being configured to receive the closed end of the receptacle bag therethrough thereby permitting the receptacle bag to hang down out of view of the user.

6. The animal waste collection device as described in claim 5 wherein the notched-out underside is configured so that the receptacle bag hangs downward with the weight of gravity following waste pick-up and enabling multiple uses without any possibility of the waste in the bag falling out during multiple waste collections.

7. The animal waste collection device as described in claim 1 wherein the grip is a hooked grip that permits firm and comfortable grasping of the device when picking up animal waste, the handle shape being ergonomically sound as to permit the device to be grasped in such a manner as to hang straight downward when carrying it and positioned as to shield the user from the distasteful view and smell of animal waste in the receptacle bag and the handle having a shape such that it can be hooked over the forearm when not in use to free up both hands.

8. An animal waste collection device comprising:
    a grip;
    an elongated handle fixed to the hooked grip;
    a substantially hollow cylindrical member having an anterior portion, a posterior portion, a defined hollow interior area, and a notch defined in an under side of the posterior portion and in communication with the interior area, the elongated handle being fixed to an upper side of the cylindrical member, the notch having an anterior part and defining about half the longitudinal length of the cylindrical member;
    a receptacle bag having a closed end and an open end, the closed end of the receptacle bag being adapted to be removably received in the cylindrical member, the open end of the receptacle bag being adapted to be rolled back inside-out over the anterior portion of the cylindrical member; and
    an elastic band adapted to be removable fitted around the cylindrical member and the rolled back portion of the receptacle bag, the elastic band being receivable in the notch adjacent the anterior part of the notch with a portion of the elastic band opposite thereof being adjacent the handle, sides of the elastic band adjacent to the handle and anterior part of the notch respectively being opposite of each other thereby securing the elastic band in position and preventing the elastic band from dislodging from the cylindrical member;
    wherein the notch is configured to receive the closed end of the receptacle bag therethrough;

wherein the upper side of the posterior portion being configured to extend out over the notch so as to prevent viewing of the closed end of the receptacle bag received through the notch therebelow.

9. The animal waste collection device as described in claim 8, wherein the grip is a hooked grip that permits firm and comfortable grasping of the device when picking up animal waste.

10. The animal waste collection device as described in claim 9, wherein the notch is configured so that the receptacle bag hangs downward with the weight of gravity following waste pick-up and enabling multiple uses without any possibility of the waste in the bag falling out during multiple waste collections.

* * * * *